Nov. 7, 1933.  H. S. BRADY  1,934,585
APPARATUS FOR VACUUM SEALING SCREW CAP CONTAINERS
Original Filed Sept. 7, 1928
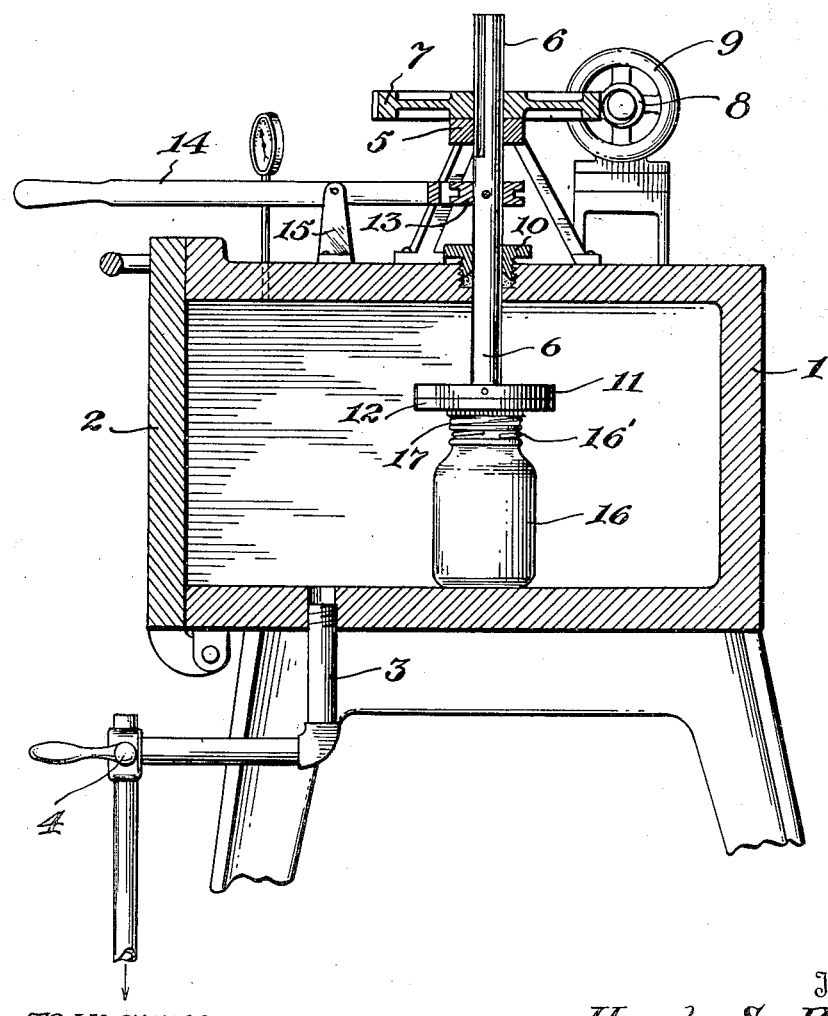
TO VACUUM
Inventor
Hugh S. Brady Patented Nov. 7, 1933

1,934,585

UNITED STATES PATENT OFFICE 1,934,585

APPARATUS FOR VACUUM SEALING SCREW CAP CONTAINERS

Hugh S. Brady, Wheeling, W. Va., assignor to Hazel-Atlas Glass Company, Wheeling, W. Va., a corporation of West Virginia Original application September 7, 1928, Serial No. 304,546. Divided and this application November 23, 1932. Serial No. 644,102

2 Claims. (Cl. 226—82)

The invention relates to the vacuum sealing of containers, and one of the objects of the invention is to provide a simple and inexpensive apparatus for sealing screw cap containers, and especially those in which conventional screw caps are employed. This application is a division of my application Ser. No. 304,546, filed September 7, 1928.

Heretofore vacuum sealing with screw closures has been unknown commercially; and requisites of commercial success are, that the caps be inexpensive in manufacture, and that the operation of sealing be rapid and efficient. Accordingly, the present invention involves the use of the ordinary, inexpensive, conventional screw caps, and apparatus by which the caps may be secured on the container with the same facility and rapidity as the several types of non-screw vacuum caps in common use.

The apparatus will now be described, reference being had to the accompanying drawing; in which The figure is a vertical sectional view of the apparatus for vacuumizing the receptacles and securing the screw caps in sealing position.

Referring to the drawing in more detail, numeral 1 indicates a sealing chamber, provided with a door 2. Associated with the sealing chamber, at any conventional point, is a pipe 3, leading to a vacuum pump or vacuum tank. Mounted in this line is a two-way valve 4, which in one position provides communication between the source of vacuum and the sealing chamber and shuts off communication with the atmosphere; and which in the other position, shuts off communication with the source of vacuum, and opens communication between the atmosphere and the sealing chamber.

After the sealing chamber has reached the desired degree of vacuum, and the container has been sealed, in the manner to be described hereinafter, the valve 4 is moved to position to provide communication between the sealing chamber and the atmosphere, thereby breaking the vacuum, and permitting the door to be opened for the removal of the sealed container. The making and breaking of the vacuum may be automatically controlled, if desired, or may be controlled by any preferred hand-operated means; however, the means for controlling the vacuum constitutes no novel feature of the subject matter of this application; and accordingly, it is sufficient to illustrate the conventional two-way valve, for that purpose.

Numeral 5 indicates a bracket mounted on the top of the sealing closet, and mounted in this bracket for rotary and vertically reciprocating movements, is a spindle 6. This spindle is slidably keyed to a worm wheel 7, which rests on the top of the bracket 5, and meshes with a worm 8, driven continuously in the same direction by an electric motor 9. Thus the spindle 6 is caused to rotate continuously in one direction.

The spindle passes downwardly through a bushing 10, into the sealing chamber, and the lower end of the spindle carries a capping head 11. The lower face of the capping head is preferably provided with a sheet of appropriate material 12, such as fibrous material, for engaging the screw cap, as to be hereinafter described.

A collar 13 is pinned or otherwise secured to the spindle 6, and operatively associated with this collar is a lever 14, pivotally mounted at 15. By means of this lever the spindle 6 is lowered and raised, while being continuously rotated, to move the capping head into and out of contact with the screw cap which is to be screwed into sealing position after the glass or other container has been vacuumized. The capping head 11 may be raised and lowered automatically or by hand, but in the form illustrated herein a hand operated lever 14 is employed for raising and lowering the head.

For the purpose of illustrating the mode of operation, I have shown in the sealing closet a glass container or receptacle 16 which is to be vacuumized, and which is provided with any desired form of screw threads 16'. Loosely mounted on the container, and preferably loosely engaging the screw threads 16, is a conventional screw cap 17. It will be understood that the caps are placed on the containers before introducing them into the vacuum closet; this preliminary capping being accomplished either by hand or machinery. In the present instance, I have shown only one container in the vacuum closet, but it will be understood that the invention contemplates the simultaneous sealing of a plurality of containers.

The container being in the vacuum closet, with the screw cap mounted thereon and preferably loosely engaging the screw threads, and the door 2 being closed, the two-way valve 4 is moved to position to open communication between the sealing closet and the source of vacuum (not shown). As soon as the vacuum closet reaches the desired degree of vacuum, the container is ready to be sealed. To effect the sealing the lever 14 is moved upwardly to bring the capping head, or the fibrous or other material on the lower face thereof, into engagement with the screw cap 17. As stated hereinbefore, the capping head is continuously rotating, and when it is thus brought into engagement with the conventional screw cap the latter is caused to rotate therewith by reason of the frictional engagement; whereby the cap is tightly secured in place in sealing position on the container. If desired, vacuum may be employed to prevent relative rotation between the capping head and cap while the latter is being screwed into sealing position. Ordinarily it will not be necessary to provide means to prevent rotation of the container during the capping operation, but it will be understood that any ordinary means may be employed for that purpose where desirable or necessary.

The container having been vacuumized, and the cap having been screwed into sealing position, the lever 14 is depressed to lift the capping head from the cap, the valve 4 is moved to position to break the vacuum in the sealing closet, the door 2 is opened, the vacuumized and sealed container is removed, and the cycle of operation is started over again by the introduction of another container with a screw cap loosely fitted thereon.

By means of the apparatus described above, ordinary and inexpensive conventional screw caps are employed as vacuum caps. The caps are as quickly and as effectively secured in sealing position as are the non-screw vacuum caps now known, and will effectively reseal the container after it has been opened, which is not true of any vacuum caps previously known.

The apparatus disclosed herein may be changed and modified in various respects without departing from the spirit of the invention; and all such changes and modifications are intended to be included within the scope of the appended claims.

What I claim is:

1. An apparatus for vacuumizing screw cap containers, including a sealing closet, means for vacuumizing the sealing closet, a capping head for engaging the screw caps on the containers, means for continuously rotating the capping head in one direction, and means for raising and lowering the capping head.

2. An apparatus for vacuumizing screw cap containers, including a sealing closet, means for vacuumizing the sealing closet, a capping head for engaging the screw caps on the containers, a motor for continuously rotating the capping head in one direction, and a lever for raising and lowering the capping head during its rotation.

HUGH S. BRADY.